Aug. 7, 1951 — M. A. ELLIOTT — 2,563,592
TUBE PLUG
Filed Aug. 21, 1945

Inventor
MORRIS AUBREY ELLIOTT.
By Howard J. Whelan.
Attorney

Patented Aug. 7, 1951

2,563,592

UNITED STATES PATENT OFFICE 2,563,592

TUBE PLUG

Morris Aubrey Elliott, Baltimore, Md.

Application August 21, 1945, Serial No. 611,850

2 Claims. (Cl. 220—24.5)

This invention relates to closures for piping and more particularly to plugs adaptable for internal insertion in the ends thereof, and one that can be applied in a universal manner to plural sizes of pipe.

In a particular form of device of this nature, the type of plugs used for insertion in pipe ends to close them, have a straight cylindrical form or perhaps a slight taper. Each plug is intended for one size of pipe or duct and cannot be used appropriately for any other size. Another disadvantage consists in the tendency of such plugs to stick too tightly or become too loose, and therefore practically useless in many instances.

It is an object of the present invention to provide a new and improved type of pipe plug that will avoid one or more of the disadvantages and limitations of the prior art.

Another object of the present invention is to provide a new and improved type of pipe plug that can be of a universal nature so that one size can be applied to many sizes of piping, without structural change.

An additional object of the present invention is to provide a new and improved type of pipe plug, that will be self-holding and subject to facile insertion or removal without injury thereto.

In the drawings is shown an example of a device of this nature, by way of illustration. This device embodies the principles of the invention, and its views in the drawings are as follows.

Similar reference characters refer to similar parts throughout the drawings.

Figure 1:
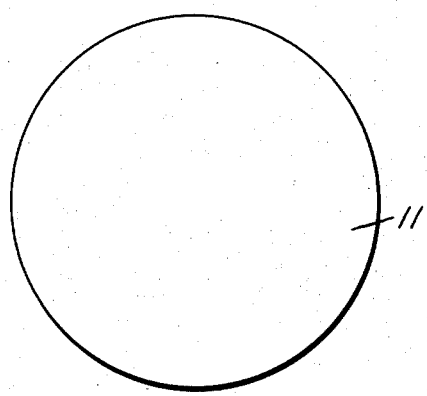
Figure 1 is a plan view of the device embodying this invention.
Figure 4:
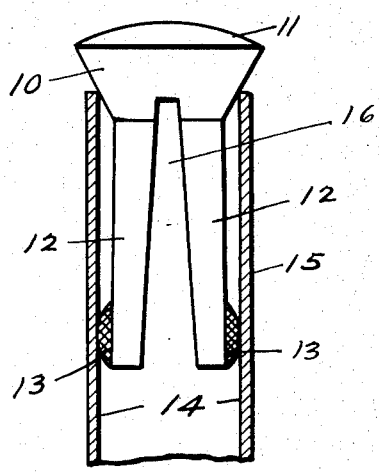
Figure 4 shows the device inserted in a piece of pipe to keep its end from becoming damaged.
Figure 2:
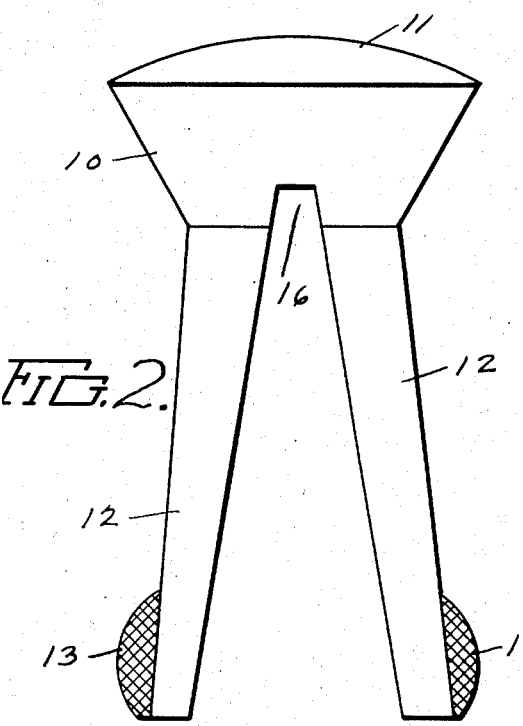
Figure 2 is a front elevation of Figure 1.
Figure 3:
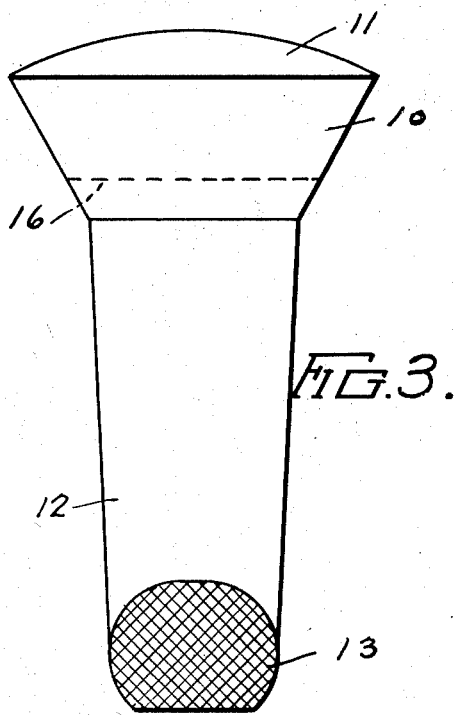
Figure 3 is a side elevation of Figure 1.

In the drawings is shown a particular form of the invention in which 10 represents a tapered circular body piece adapted to fit inside a series of consecutive sizes of duct, pipe or tubing 15 at its open ends, and close same. The top surface 11 of the plug is rounded as indicated. Legs 12 extend longitudinally from the restricted portion of the body piece and are tapered rectangularly with raised semi-spherical knurled or checkered pads 13 provided on the end portions, so as to engage the internal surface 14 of the duct 15. The legs are pressed together at insertion so the pads 13 will go into the duct readily and then expand resiliently against the duct when inside. This secures the plug in any position in the duct so that it will take up any vibration, shock or disturbance that may arise. The pads are preferably of the form shown. The legs are so arranged in the piece 10, as to form a tapered slot 16 in the head thereof which will provide for a greater outward flexure.

The form of this plug provides a number of advantages outside of fitting the open ends of several different internal diameters or sizes of duct, pipe or tubing with the same size plug. This enables the plug to adapt itself in a universal manner to different sizes of duct in an adequate manner. The tapered form of the periphery of the plug head permits it to be handled easily by the fingers in placement or removal. The pads 13 provide sufficient contact to make the plug effective, but avoid contact through their whole surface that would increase the chances of sticking or forming a corroded attachment. The tapered rectangular section of the legs induces a steady outward pressure in the direction of the pads so that bending and twisting will be avoided and the rounded knurled or checkered surface of the pads will be directed in any direction selected. The provision of one plug to take the place of many plugs enables a substantial saving in quantities needed and incidental economy in stock requirements.

The varied parts of the device are integrally connected and cannot therefore be separated or displaced. The plug is easy to apply. It may also be used for cleaning the end portions of the duct. It can be applied to a duct that is crooked, since the legs and the tapered piece can adjust themselves to angular positioning.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A sealing plug for pipes and the like, comprising a head having a tapered conical surface for engaging the open edge of a pipe in which the plug is mounted and to provide a closure therefor, a pair of spaced-apart, flexible legs extending from said head, said legs having spherically shaped knurled pads secured outwardly at the extremity of each of said legs for engaging and gripping the inner walls of the pipe in which the plug is mounted.

2. A sealing plug for pipes and the like, comprising a head having a tapered conical surface for adjustable engagement with the open edge of a pipe in which the plug is mounted and to provide a closure therefor, said head having a slot at the base thereof, a pair of spaced apart, flexible legs extending from said head, the space between said legs being in alignment with the slot in the base of said head, said legs having spherically shaped pads secured outwardly at the extremity of each of said legs, said pads having a knurled periphery for secure engagement with the inner walls of the pipe in which the plug is mounted.

MORRIS AUBREY ELLIOTT.

REFERENCES CITED

The following references are of record in the file of this patent:

UNITED STATES PATENTS

| Number | Name | Date |
| --- | --- | --- |
| 487,327 | Hopkins | Dec. 6, 1892 |
| 791,351 | Malloy | May 30, 1905 |
| 1,253,773 | Bint | Jan. 15, 1918 |
| 1,830,460 | Berge | Nov. 3, 1931 |
| 1,992,431 | Key | Feb. 26, 1935 |
| 1,993,307 | Nicholson | Mar. 5, 1935 |